| | | |
|---|---|---|
| (12) | United States Patent<br>Yu | (10) Patent No.: US 7,571,574 B2<br>(45) Date of Patent: Aug. 11, 2009 |

(54) INSERTION ASSEMBLY FOR DOOR AND WINDOW FRAMES

(75) Inventor: Jinzhang Yu, Zhejiang (CN)

(73) Assignee: Xiangyi Dong, Zhejiang Province (CN)

( * ) Notice: Subject to any disclaimer, the term of this patent is extended or adjusted under 35 U.S.C. 154(b) by 281 days.

(21) Appl. No.: 10/594,159

(22) PCT Filed: Mar. 7, 2005

(86) PCT No.: PCT/CN2005/000273

§ 371 (c)(1),
(2), (4) Date: Sep. 26, 2006

(87) PCT Pub. No.: WO2005/093197

PCT Pub. Date: Oct. 6, 2005

(65) Prior Publication Data

US 2007/0240373 A1 Oct. 18, 2007

(30) Foreign Application Priority Data

Mar. 26, 2004 (CN) .................. 2004 2 0007775

(51) Int. Cl.
*E06B 3/96* (2006.01)
*E06B 3/00* (2006.01)
*E04C 2/38* (2006.01)
*E04B 7/00* (2006.01)
*A47G 29/00* (2006.01)

(52) U.S. Cl. .................. 52/213; 52/204.57; 52/204.58; 52/656.1; 52/656.2; 52/656.5; 52/656.4; 52/272; 312/265.1

(58) Field of Classification Search .................. 403/231, 403/363; 52/204.57, 204.58, 213, 656.1, 52/656.2, 656.3, 656.4, 656.5, 656.6, 656.7, 52/656.8, 656.9, 272; 312/265.1, 265.2, 312/265.3, 265.4

See application file for complete search history.

(56) References Cited

U.S. PATENT DOCUMENTS

| 3,673,674 | A | * | 7/1972 | Catulle | ................ | 29/464 |
| 3,828,516 | A | * | 8/1974 | Kern | ................ | 403/250 |
| 3,835,610 | A | * | 9/1974 | Harper et al. | ................ | 403/231 |
| 4,015,382 | A | * | 4/1977 | Noyes | ................ | 52/211 |
| 4,689,933 | A | * | 9/1987 | Biro | ................ | 52/656.5 |
| 4,831,804 | A | * | 5/1989 | Sayer | ................ | 52/475.1 |

(Continued)

FOREIGN PATENT DOCUMENTS

CN  1111729 A  11/1995

(Continued)

OTHER PUBLICATIONS

"International Search Report for Application No. PCT/CN2005/000273", 4 pages.

*Primary Examiner*—Brian E. Glessner
*Assistant Examiner*—Omar Hijaz
(74) *Attorney, Agent, or Firm*—Leffert Jay & Polglaze, P.A.

(57) ABSTRACT

Disclosed is an insertion assembly for door and window frames which comprises a side frame and a transverse frame which is perpendicular to the side frame. An L-shape fixed member is provided at the outside of a connection portion of the side frame and the transverse frame, a side fastening bolt is provided to pass through a through hole at an upright portion of the fixed member and a through hole at the side frame to connect a side fastening panel, and a transverse fastening bolt is provided passing through a through hole at a transverse portion of the fixed member and a through hole at the transverse frame to connect a transverse panel.

3 Claims, 2 Drawing Sheets

U.S. PATENT DOCUMENTS

| | | | | |
|---|---|---|---|---|
| 5,046,791 | A | * | 9/1991 | Kooiman ................ 312/265.1 |
| 5,671,580 | A | * | 9/1997 | Chou ........................ 52/656.4 |
| 6,067,760 | A | * | 5/2000 | Nowell .................... 52/204.57 |
| 6,503,020 | B1 | * | 1/2003 | Mascioletti et al. ......... 403/402 |
| 2005/0193680 | A1 | * | 9/2005 | Wang ........................ 52/656.9 |

FOREIGN PATENT DOCUMENTS

| | | | |
|---|---|---|---|
| CN | 2419355 Y | | 2/2001 |
| DE | 19524612 A1 | | 1/1997 |
| GB | 2159864 A | * | 12/1985 |
| JP | 9310479 A | | 12/1997 |
| JP | 11101072 A | | 4/1999 |
| JP | 11101072 A | * | 4/1999 |
| WO | WO 02/075093 A1 | * | 9/2002 |
| WO | WO-03058018 A1 | | 7/2003 |
| WO | WO 03058018 A1 | * | 7/2003 |

* cited by examiner

INSERTION ASSEMBLY FOR DOOR AND WINDOW FRAMES

RELATED APPLICATIONS

This application is a nationalization under 35 U.S.C. 371 of PCT/CN2005/000273, filed Mar. 7, 2005 and published as WO 2005/093197 A1 on Oct. 6, 2005, which claimed priority under U.S.C. 119 to Chinese Application No. 200420007775.3, filed Mar. 26, 2004, which applications and publication are incorporated herein by reference and made a part hereof.

TECHNICAL FIELD OF THE INVENTION

This invention relates to a field of building materials and more particularly to an insertion assembly for door and window frames.

BACKGROUND OF THE INVENTION

Recently, profiles (also called sections or section bars) made from aluminum alloy or steel-plastics have been widely used in the building material area. Especially, they have been utilized to fabricate most of door and window frames of buildings instead of the wood or steel. A technical issue on how to connect parts of the profile naturally arises.

Current profiles have been made by welding or inserting parts thereof. For example, a steel profile can be made by welding parts thereof, an aluminum alloy profile can be manufactured by welding or connecting parts thereof, and steel-plastic profile can be fabricated by welding parts thereof. However, in a practical fabrication or installation process, although the flatness of the profile is good, there are some defects such as lower accuracy of its shape, inconvenience of assembling, and difficulty in fabricating on the spot after the profiles are cut to form a frame. Further, since a deformation of the profile will occur after it is used for a period of time, it is not convenient to disassemble the profile for maintenance thereby causing a waste. Therefore, there is a need to solve the problem of connecting parts of the profile.

SUMMARY OF THE INVENTION

The object of the present invention is to provide an insertion assembly for door and window frames that can make casement frames of a door or a window conveniently assembled and disassembled, and can improve the accuracy and strength thereof.

To realize the above object, the present invention provides an insertion assembly for door and window frames, which comprises a side frame and a transverse frame disposed perpendicularly to the side frame. The side frame is crossly connected to the transverse frame, and an L-shape fixed member is provided at the outside of a place where the side frame is connected to the transverse frame. A side fastening bolt passes through a through hole at an upright portion of the outer fixed member and a through hole (not shown) at the side frame to connect a side fastening panel, and a transverse fastening bolt passes through a through hole at a transverse portion of the outer fixed member and a through hole (not shown) at the transverse frame to connect the transverse panel.

According to the present invention, the side frame and the transverse frame are connected to each other by the outer fixed member and the fastening plate. This insertion assembly has a relatively simple configuration, improves the accuracy of the door and window frame, ensures the verticality between the side frame and the transverse frame, reduces the accuracy requirements of cut edges of the side frame and the transverse frame, and avoids defects of the insertion assembly, such as a lower accuracy caused in the welding of the profile and a lower strength caused in the adhering of the same. The profile of the present invention is convenient in use, installation, disassembly and maintenance, and facilitates to be standardized in the manufacture and management.

EMBODIMENTS OF THE INVENTION

Figure 1:
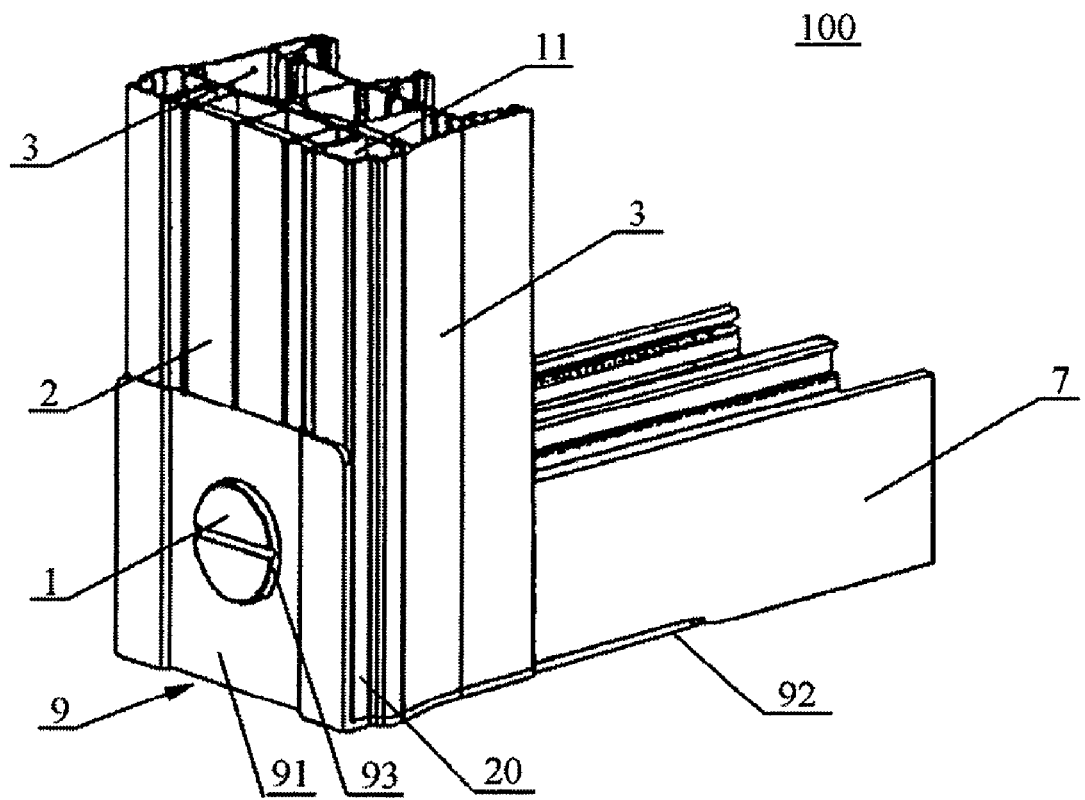
FIG. 1 is a perspective view showing an insertion assembly of the present invention.
Figure 2:
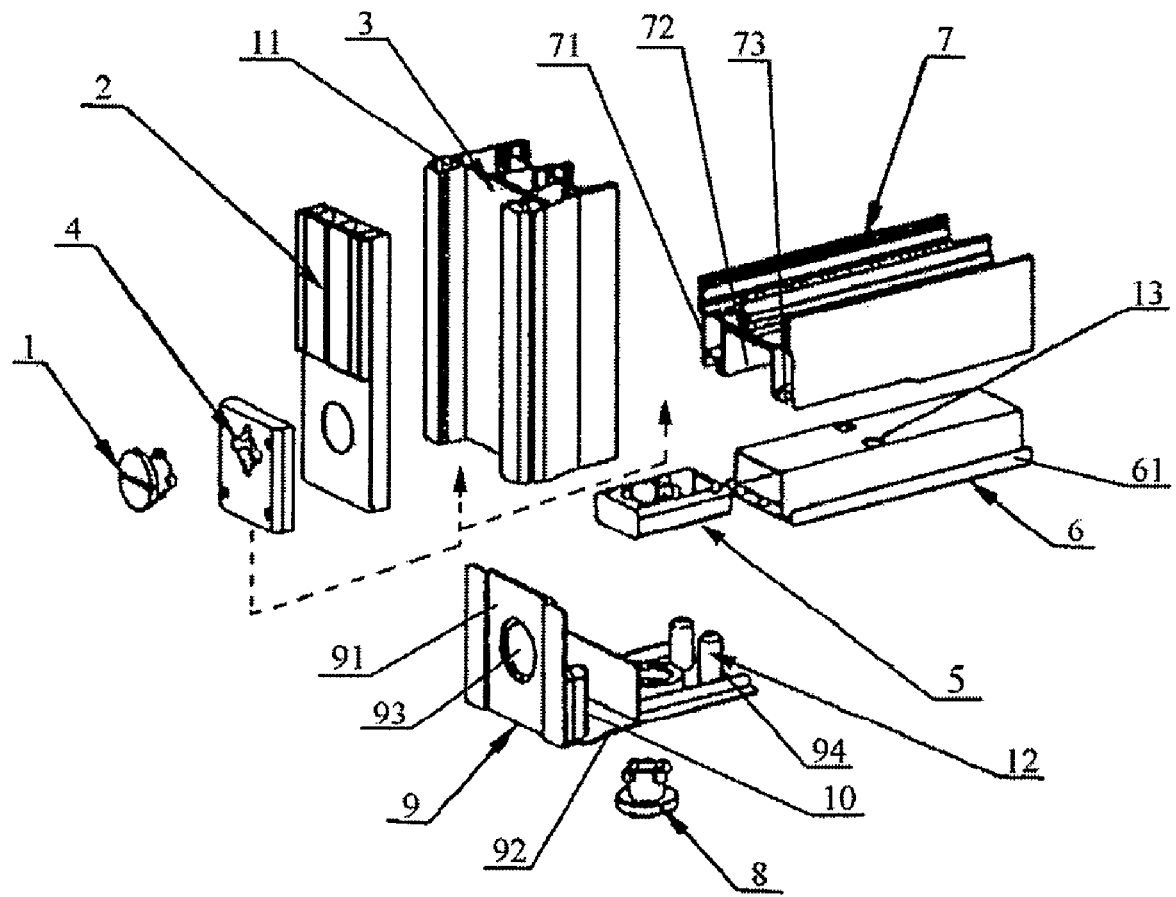
FIG. 2 is an exploded view showing parts of the insertion assembly of FIG. 1.

Referring now to FIGS. 1 and 2, which show an embodiment according to the present invention, an insertion assembly 100 for door and window frames includes a side frame 3 and a transverse frame 7 disposed perpendicularly to the side frame 3. The side frame 3 and the transverse frame 7 may be those profiles commercially available or profiles having a specific profile.

An L-shape fixed member 9 is provided at the outside of a connection section 20 of the side frame 3 and the transverse frame 7. The fixed member 9 may be a specific structure having an angle of 90° made by a mould so as to ensure the verticality between the side frame 3 and the transverse frame 7.

A side fastening bolt 1 is provided to pass through a through hole 93 at an upright portion 91 of the outer fixed member 9 and a through hole (not shown) at the side frame 3 to connect a side panel 4 so as to form an integral structure. Similarly, a transverse fastening bolt 8 passing through a through hole at a transverse portion 92 of the outer fixed member 9 and a through hole (not shown) at the transverse frame 7 connects a transverse panel 5.

In order to further improve the strength of the insertion assembly, pins 10 are provided at the transverse portion of the outer fixed member 9 and holes 11 corresponding to the pins are formed at an opposite surface of the side frame 3 into which the pins 10 can be inserted.

In this embodiment provide two holes 11, each of which is provided at an edge of the side frame 3. A groove is formed between the two holes 11. A side steel lining panel 2 is provided in the groove and the side fastening panel 4 is sandwiched between the side steel lining panel 2 and the fixed member 9 so that the side fastening bolt 1 can make the side fastening panel 4, the upright portion of the outer fixed member 9 and the side steel lining panel 2 coupled together. The strength of the insertion assembly can be improved with the side steel lining panel 2.

At a lower portion 71 of the transverse frame 7 is provided a rectangular slot 72 within which a hollow transverse steel lining member 6 is provided. Lower extended edges 61 of the transverse steel lining member 6 are engaged to lower ends 73 of the side walls of the rectangular slot 72. A transverse fastening panel 5 is disposed within the hollow transverse steel lining member 6. The transverse fastening bolt 8 is connected to the transverse fastening panel 5 so as to secure the transverse frame in which the transverse steel lining member 6 is provided, thereby further improving the bearing capacity of the insertion assembly in the transverse direction.

Positioning pins 12 are formed at an upper surface 94 of the transverse portion of the fixed member 9, and positioning holes 13 are correspondingly provided at the transverse steel lining member 6 to receive the positioning pins 12 further reinforcing the installation accuracy and structural strength of the insertion assembly.

The insertion assembly for door and window frames according to the present invention has a simple structure, facilitates applications and can be manufactured in a high standardized level.

The invention claimed is:

1. An insertion assembly for door and window frames, comprising a side frame and a transverse frame disposed perpendicularly thereto, wherein an L-shaped fixed member is provided at the outside of a connection portion of the side frame and the transverse frame, a side fastening bolt is provided to pass through a through hole at an upright portion of the L-shaped fixed member and a through hole at the side frame to connect a side fastening panel, a transverse fastening bolt is provided passing through a through hole at a transverse portion of the L-shaped fixed member and a through hole at the transverse frame to connect a transverse panel, two pins are provided at the transverse portion of the L-shaped fixed member, two holes are provided at a surface of the side frame opposite to the transverse portion to receive the pins, each of the holes is formed at an edge of the side frame, a side steel lining panel is provided in a groove formed between the two holes, the side steel lining panel and the side fastening panel are sandwiched between the side frame and the L-shaped fixed member, the side fastening panel is sandwiched between the side steel lining panel and the L-shaped fixed member, and the side fastening bolt is used to connect the side fastening panel, the upright portion of the L-shaped fixed member and the side steel lining panel together.

2. The insertion assembly according to claim 1, wherein at a lower portion of the transverse frame is formed a rectangular slot in which a hollow transverse steel lining member is provided, lower ends of the side walls of the slot are engaged to lower extended ends of the transverse steel lining member, a transverse fastening panel is provided within the hollow transverse steel lining member and the transverse fastening bolt is connected to the transverse fastening panel.

3. The insertion assembly according to claim 2, wherein positioning pins are formed at an upper surface of the transverse portion of the L-shaped fixed member, and positioning holes into which the positioning pins can be inserted are provided at the transverse steel lining member.

* * * * *